Dec. 30, 1924.                                              1,521,425
T. A. BUCKLEY

IMPLEMENT FOR CLEANING TEETH

Filed Oct. 6, 1922

WITNESSES
Edw. Thorpe.
P. H. Pattusy.

INVENTOR
T. Andrew Buckley
BY
ATTORNEYS

Patented Dec. 30, 1924.

1,521,425

UNITED STATES PATENT OFFICE.

THOMAS A. BUCKLEY, OF BROOKLYN, NEW YORK.

IMPLEMENT FOR CLEANING TEETH.

Application filed October 6, 1922. Serial No. 592,306.

*To all whom it may concern:*

Be it known that I, THOMAS A. BUCKLEY, a citizen of the United States, and a resident of the city of New York, borough of Brooklyn, in the county of Kings and State of New York, have invented a new and Improved Implement for Cleaning Teeth, of which the following is a full, clear, and exact description.

The present invention relates to new and useful improvements in implements for cleaning teeth, and it pertains more particularly to an implement intended for home use by individuals as distinguished from implements used by the dental profession for this purpose.

It is one of the objects of the invention to provide means whereby the teeth may be polished by suitable material, such, for example, as absorbent cotton rolled.

It is a further object of the invention to construct the implement so that the absorbent cotton roll will be securely held thereby.

It is a further object of the invention to so construct the implement that dental floss may be retained thereby in such a manner that the same may be inserted in the spaces between the teeth to remove foreign matter therefrom.

It is a further object of the invention to provide a tongue-scraping means in combination with the implement.

With the above and other objects in view, reference is had to the accompanying drawings, in which—

Figure 1:
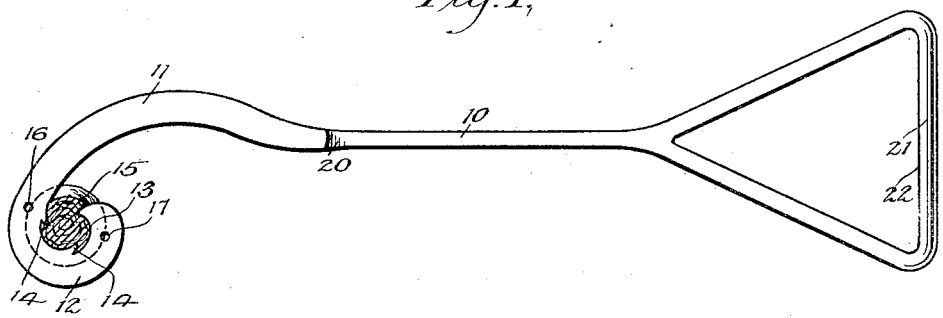
Figure 1 is a view in side elevation of an implement constructed in accordance with the present invention.

Referring more specifically to the drawings, the reference character 10 designates the body portion of the handle, and said body portion is formed of relatively thin material, such as celluloid, ivory, metal, or the like. One end of this body portion is curved, as indicated by the reference character 11, and said curved end is slightly thickened as shown. The extremity 12 of the curved end 11 is bent to form a substantially circular space 13 between the extremity of the handle and the curved end thereof, and formed in said curved portion is a plurality of projections 14.

Figure 3:
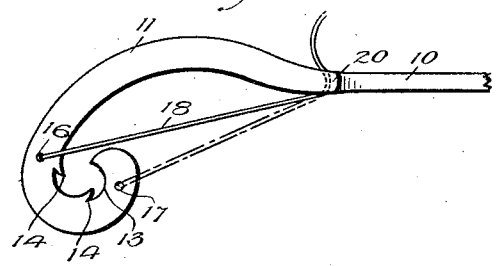
Fig. 3 is a view in side elevation showing the manner in which the dental floss is secured in position.
Figure 4:
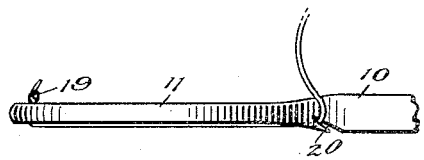
Fig. 4 is a plan view of the implement showing the manner in which the dental floss is held in position.

The reference character 15 designates an absorbent cotton roll, and said absorbent cotton roll is adapted to be retained within the circular space 13 by reason of engagement of the teeth 14 with the absorbent cotton roll. The roll 15 is inserted in the circular space by being passed through the space between the extremity of the curved end 11 and the curved extremity 12, and in passing the cotton roll through this space the same is turned slightly to facilitate the action. After the cotton has been positioned therein, it is obvious that the curved teeth 14 will serve to prevent accidental displacement of the cotton relative to said curved space, as more clearly shown in Figs. 1 and 3. The curved end 11 is provided with two openings 16 and 17, and said openings form the means for attaching a length of dental floss 18. In attaching the dental floss, one end is provided with a knot 19 and the other end is passed through either of the openings 16 and 17, after which said end is engaged with a notch 20 formed in the body portion 10 of the implement.

Figure 2:
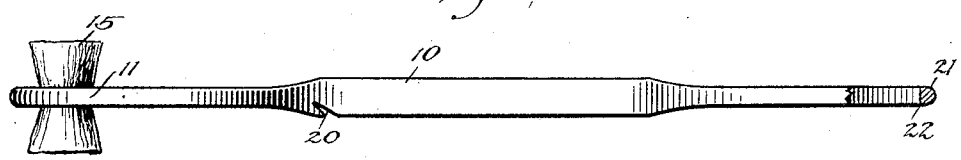
Fig. 2 is a plan view thereof partly broken away.

By this construction it is apparent that owing to the fact that the dental floss bridges the curved portion of the handle, the same may be readily passed through the space between the teeth in order to clean the same. The opposite end of the body portion 10 is formed with a triangular extension 21, and the material from which said triangular extension is formed is substantially half-round in cross section, as shown at the right-hand side of Fig. 2. It will thus be seen that a scraping edge 22 is presented in such a manner that as the device is moved over the tongue, the tongue will be scraped clean by the operation.

From the foregoing it is apparent that the present invention provides a new and improved implement for cleaning the mouth, and that in addition to providing means for retaining a roll of absorbent cotton, the device provides a tongue scraper, which tongue scraper when not employed for use as such, serves as a handle for the implement.

What is claimed is:

An implement for cleaning teeth comprising a handle having one end portion looped upon itself and spaced from the body portion of the handle, the inner surface of said looped end portion being provided with teeth.

THOMAS A. BUCKLEY.